US012526430B2

(12) United States Patent
Li et al.

(10) Patent No.: US 12,526,430 B2
(45) Date of Patent: Jan. 13, 2026

(54) OPTIMIZING VIDEO CODING USING A DEEP LEARNING MODEL

(71) Applicant: RingCentral, Inc., Belmont, CA (US)

(72) Inventors: Xiaoming Li, Cupertino, CA (US); Santosh Sethumadhavan, San Ramon, CA (US); Ehtesham Khan, San Ramon, CA (US)

( * ) Notice: Subject to any disclaimer, the term of this patent is extended or adjusted under 35 U.S.C. 154(b) by 158 days.

(21) Appl. No.: 18/235,769

(22) Filed: Aug. 18, 2023

(65) Prior Publication Data

US 2025/0063177 A1    Feb. 20, 2025

(51) Int. Cl.
*H04N 19/146* (2014.01)
*H04N 19/136* (2014.01)
*H04N 19/172* (2014.01)

(52) U.S. Cl.
CPC ......... *H04N 19/146* (2014.11); *H04N 19/136* (2014.11); *H04N 19/172* (2014.11)

(58) Field of Classification Search
CPC ... H04N 19/146; H04N 19/136; H04N 19/172
See application file for complete search history.

(56) References Cited

U.S. PATENT DOCUMENTS

| | | | |
|---|---|---|---|
| 2018/0035117 A1* | 2/2018 | Kondo | H04N 19/157 |
| 2021/0195210 A1* | 6/2021 | Yamaguchi | H04N 19/52 |
| 2023/0096567 A1* | 3/2023 | Nalci | H04N 19/42 |
| | | | 375/240.03 |

* cited by examiner

Primary Examiner — Kyle M Lotfi
(74) Attorney, Agent, or Firm — Sanjeev Bajwa

(57) ABSTRACT

A computer-implemented method for optimizing encoding video frames from a video is provided. In an embodiment, the method comprises receiving a video frame to be encoded. The method further comprises using one or more machine learning models to generate an encoding parameter value for encoding the video frame. The method further comprises comparing a first set of delta encoding values, based on the encoding parameter value, representing differences between groups of pixels of the video frame to a second set of delta encoding values, based on an alternative encoding parameter value, representing differences between the groups of pixels of the video frame, and in response to determining that the first set of delta encoding values is less than the second set of delta encoding values, selecting the encoding parameter value. The method further comprises based on the encoding parameter value, encoding the video frame to generate an encoded video frame.

17 Claims, 5 Drawing Sheets

OPTIMIZING VIDEO CODING USING A DEEP LEARNING MODEL

TECHNICAL FIELD

The present disclosure relates generally to the field of video encoding. Specifically, the present disclosure relates to systems and methods for optimizing video encoding parameters using machine learning models for compressing video captured during an online meeting.

BACKGROUND

Online meetings have become an essential part of everyday lives. For example, businesses use online meetings to discuss sensitive business matters, students use online meetings to exchange personal ideas and information, and friends and/or relatives use online meetings to engage in private conversations. Many online meetings are conducted using video conferencing software. Video conferencing adds a benefit of being able to see other participants during the meeting which results in a more engaging experience.

Currently, many video conferencing applications implement video processing algorithms to process captured video by encoding the video into a format that may be transmitted to a video conferencing server for distribution to other meeting participants. Video encoding is a process of compressing and transforming a raw video format into a digital file or format that is compatible with different computing devices and platforms. Encoding processes also compress the video such that the encoded video takes up less space. Compressed video formats are desirable as they reduce network bandwidth needed to transmit video while maintaining video quality.

Video compression techniques are largely dictated by codecs. Codecs represent different standards for compressing video. Codecs are made up of two main components, an encoder to compress video content and a decoder to decompress the video content.

As video capture devices become more and more advanced and are able to capture higher quality video, video compression techniques have become more and more important for compressing high quality video in order to conserve network bandwidth. Video codec standards define compression techniques to improve compression in order to converse network bandwidth demands. For example, video codecs, such as H266, provide superior compression techniques while preserving video quality. However, the more advanced video codecs, like H266, have complex input parameters that need to be optimized in order receive the benefit of maximum video compression while preserving video quality. Incorrectly configured input parameters may reduce either the quality of the video or reduce the amount of video compression desired. Thereby, reducing the effectiveness of implementing a video codec to compress video.

Therefore, there is a need for optimizing video compression techniques for video associated with online meetings.

SUMMARY

The appended claims may serve as a summary of the invention.

DETAILED DESCRIPTION

Figure 1:
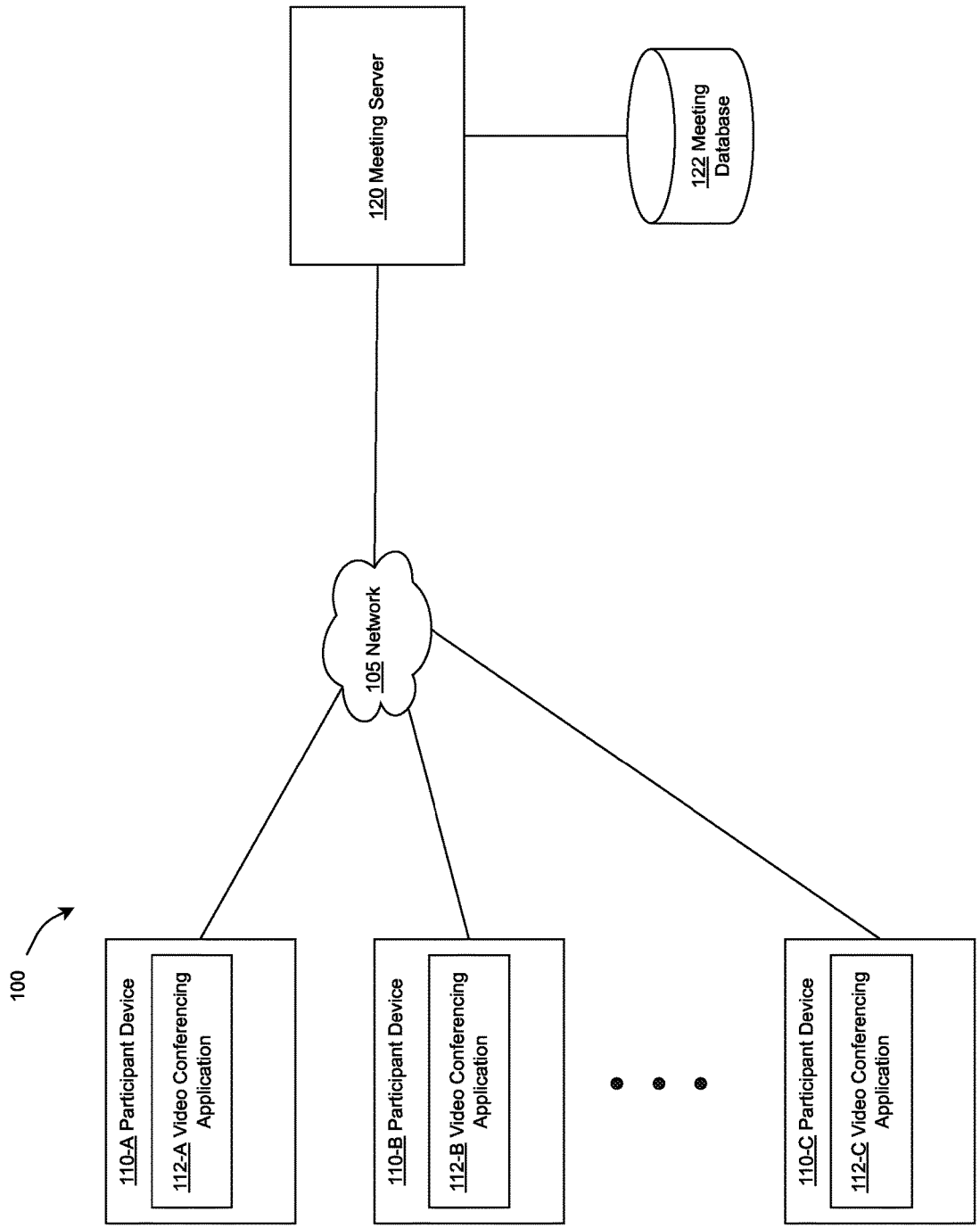
FIG. 1 is a network diagram depicting an online meeting system, in an example embodiment.

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting,"

"facilitating," "providing," "forming." "detecting." "processing," "updating." "instantiating," "identifying", "contacting", "gathering", "accessing", "utilizing", "resolving", "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things (IoT) devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

It should be understood, that terms "user" and "participant" have equal meaning in the following description.

Embodiments are described in sections according to the following outline:
 1.0 GENERAL OVERVIEW
 2.0 STRUCTURAL OVERVIEW
    2.1 MEETING SERVER
    2.2 NETWORK
    2.3 PARTICIPANT DEVICES
    2.4 COMPUTER HARDWARE OVERVIEW
 3.0 FUNCTIONAL OVERVIEW
    3.1 CONFERENCE MANAGEMENT SERVICE
    3.2 VIDEO RECEIVING SERVICE
    3.3 MACHINE LEARNING SUBSYSTEM
       3.3.1 MACHINE LEARNING MODELS
       3.3.2 MACHINE LEARNING MANAGEMENT SERVICE
    3.4 BLOCK PREDICTION SERVICE
    3.5 BLOCK TRANSFORMATION SERVICE
    3.6 PARAMETER TUNING SERVICE
    3.7 VIDEO ENCODING SERVICE
 4.0 PROCEDURAL OVERVIEW
 5.0 MACHINE LEARNING MODELS
    5.1 ARTIFICIAL NEURAL NETWORKS
    5.2 ILLUSTRATIVE DATA STRUCTURES FOR NEURAL NETWORK
    5.3 BACKPROPAGATION
    5.4 AUTOENCODER
    5.5 PRINCIPAL COMPONENT ANALYSIS
    5.6 RANDOM FOREST
 6.0 TRAINING MACHINE LEARNING MODELS 1.0 General Overview Traditionally, video conferencing applications use process intensive video processing algorithms to process and compress video in real-time or post capture. When video processing algorithms are enabled with advanced video codec algorithms, the video processing may become too resource intensive for computing devices to execute effectively. As a result, video displays may become delayed and/or interrupted due to the intense processing resources to encode the video or the increased bandwidth required to transmit large video data that may not be optimally compressed.

The presently described approaches seek to address this computing resource bottleneck by implementing machine learning models to optimize video coding parameters such that encoded video is optimally compressed without needing intensive computing resources. Specifically, the technical solution provides a mechanism to reduce computing resource bottlenecks by using machine learning models to analyze incoming video data and determine which compression techniques are optimally suited for video compression, thereby providing a smoother video conferencing experience.

A computer-implemented method for optimizing encoding of video frames from a video is provided. In an embodiment, the method comprises receiving a video frame to be encoded. The method further comprises using one or more machine learning models to generate an encoding parameter value for encoding the video frame. The method further comprises comparing a first set of delta encoding values, based on the encoding parameter value, representing differences between groups of pixels of the video frame to a second set of delta encoding values, based on an alternative encoding parameter value, representing differences between the groups of pixels of the video frame, and in response to determining that the first set of delta encoding values is less than the second set of delta encoding values, selecting the encoding parameter value. The method further comprises based on the encoding parameter value, encoding the video frame to generate an encoded video frame.

A non-transitory computer-readable medium storing a set of instructions is also provided. In an embodiment, when the set of instructions are executed by a processor the set of instructions cause: receiving a video frame to be encoded; using one or more machine learning models: generating an encoding parameter value for encoding the video frame; comparing a first set of delta encoding values, based on the encoding parameter value, representing differences between groups of pixels of the video frame to a second set of delta encoding values, based on an alternative encoding parameter value, representing differences between the groups of pixels of the video frame; in response to determining that the first set of delta encoding values is less than the second set of delta encoding values, selecting the encoding parameter value; and based on the encoding parameter value, encoding the video frame to generate an encoded video frame.

A network-based system for optimizing encoding of video frames is also provided. The system comprises a processor and a memory operatively connected to the processor. The memory stores instruction that, when executed by the processor, cause: receiving a video frame to be encoded; using one or more machine learning models: generating an encoding parameter value for encoding the video frame; comparing a first set of delta encoding values, based on the encoding parameter value, representing differences between groups of pixels of the video frame to a second set of delta encoding values, based on an alternative encoding parameter value, representing differences between the groups of pixels of the video frame; in response to determining that the first set of delta encoding values is less than the second set of delta encoding values, selecting the encoding parameter value; and based on the encoding parameter value, encoding the video frame to generate an encoded video frame.

2.0 Structural Overview

FIG. 1 is a network diagram depicting an online meeting system 100 in which various implementations, as described herein, may be practiced. The online meeting system 100 enables a plurality of participants to engage in an online meeting session in which video conferencing is enabled. In some examples, one or more components of the online meeting system 100, including participant devices 110-A, 110-B, 110-C, a meeting server 120, and a meeting database 122 may be used to implement computer programs, applications, methods, processes or other software to perform the described techniques and to realize the structures described herein. In an embodiment, the online meeting system 100 comprises components that are implemented at least partially by hardware at one or more computing devices, such as one or more hardware processors executing program instructions stored in one or more memories for performing the functions described herein.

As shown in FIG. 1, the online meeting system 100 includes one or more participant devices 110-A, 110-B. 110-C, a network 105, a meeting server 120, and a meeting database 122.

2.1 Meeting Server

In an embodiment, the meeting server 120 is configured to provide online meeting services, such as video conferencing, telephony, messaging, email, file sharing, and any other types of communication between users. The meeting server 120 may be communicatively coupled to the meeting database 122 for the purposes of storing online meeting data. The meeting database 122 may include one or more physical or virtual, structured or unstructured storages. The meeting database 122 may be configured to store communication data such as audio, video, text, or any other form of communication data. The meeting database 122 may also store security data, such as meeting participant lists, permissions, and any other types of the security data. While meeting database 122 is illustrated as an external device connected to the meeting server 120, the meeting database 122 may also reside within the meeting server 120 as an internal component of the meeting server 120.

2.2 Network

In an embodiment, the network 105 facilitates the exchange of communication and collaboration of data or any other type of information between participant devices 110-A, 110-B, 110-C, and the meeting server 120. The network 105 may be any type of network that provides communications, exchanges information, and/or facilitates the exchange of data between the meeting server 120 and participant devices 110-A, 110-B, 110-C. For example, the network 105 may represent one or more local area networks (LANs), wide area networks (WANs), metropolitan area networks (MANs), global interconnected internetworks, such as the public internet, public switched telephone networks ("PSTN"), or any other suitable connections or combinations thereof that enable the online meeting system 100 to send and receive information between the components of the online meeting system 100. Each such network 105 uses or executes stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein are configured to connect to the network 105 and the disclosure presumes that all elements of FIG. 1 are communicatively coupled via network 105. The network 105 may support a variety of electronic messaging formats, and may further support a variety of services and applications for the participant devices 110-A, 110-B, 110-C.

2.3 Participant Devices

Participant devices 110-A, 110-B, 110-C are configured to execute one or more video conferencing applications 112-A, 112-B, 112-C that are configured to enable communication between the participant devices 110-A, 110-B, 110-C, and the meeting server 120. In some embodiments, the video conferencing applications 112-A, 112-B, 112-C may be web-based applications that enable connectivity through a browser, such as through Web Real-Time Communications (WebRTC). In other embodiments, the video conferencing applications 112-A, 112-B, 112-C may represent a standalone application. The meeting server 120 may be configured to execute server applications, such as a back-end application that facilitates communication and collaboration between the meeting server 120 and the participant devices 110-A. 110-B, 110-C.

In an embodiment, participant devices 110-A, 110-B. 110-C may represent a computing device such as a desktop computer, a laptop, a tablet, a smartphone, a smart television, and any other computing device having a display and audio/video capture capabilities. Participant devices 110-A, 110-B, 110-C may also include one or more software-based client applications that facilitate communications via instant messaging, text messaging, email, Voice over Internet Protocol (VOIP), video conferences, audio/video streaming, and so forth with one another.

2.5 Computer Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 2:
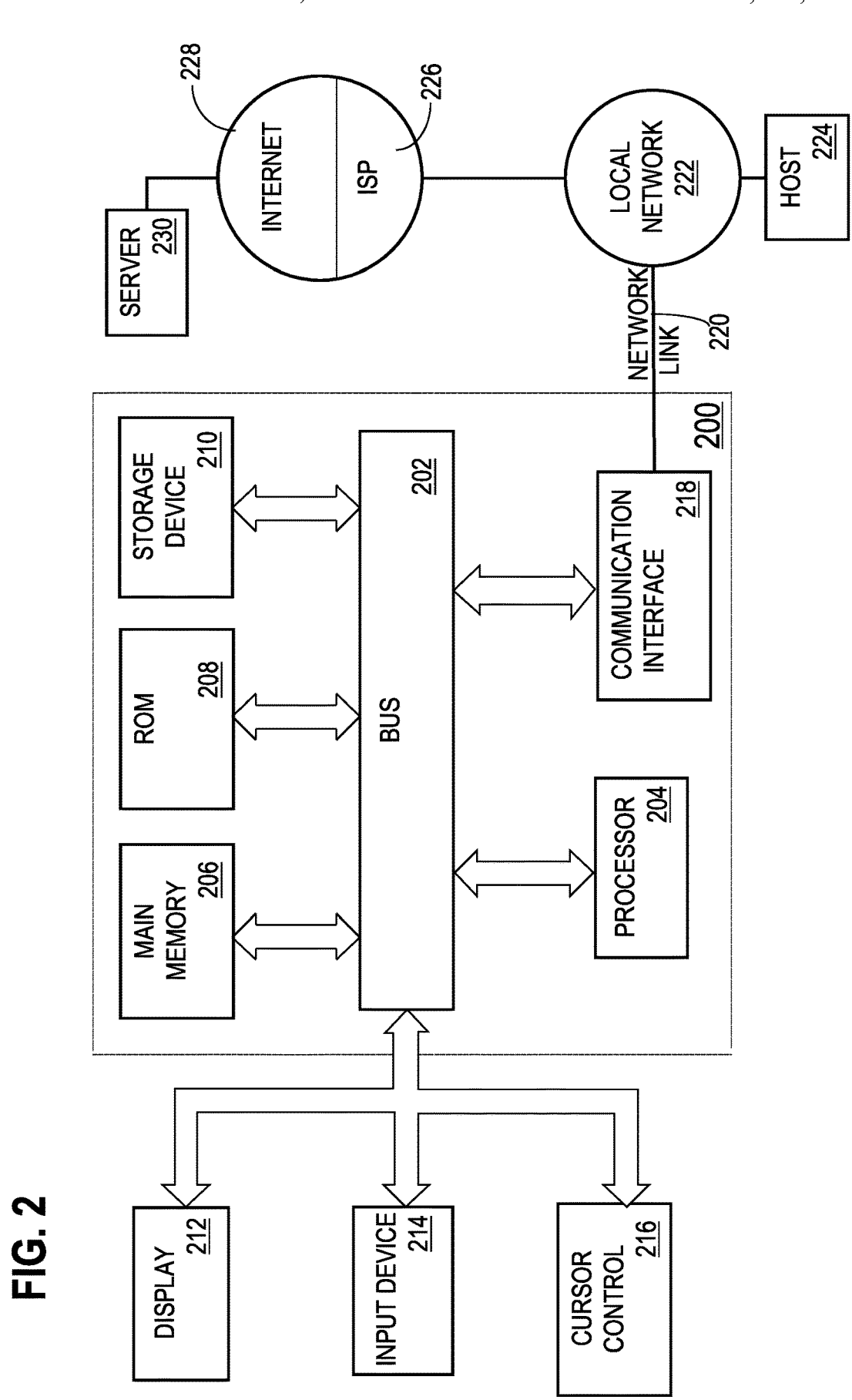
FIG. 2 is a block diagram that depicts an example computer system upon which embodiments may be implemented.

For example, FIG. 2 is a block diagram that illustrates a computer system 200 upon which an embodiment may be implemented. Computer system 200 includes a bus 202 or another communication mechanism for communicating information, and a hardware processor 204 coupled with bus 202 for processing information. Hardware processor 204 may be, for example, a general-purpose microprocessor.

Computer system 200 also includes a main memory 206, such as a random access memory (RAM) or another dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk, optical disk, or solid-state drive is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 210. Volatile media includes dynamic memory, such as main memory 206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid-state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

3.0 Functional Overview

Figure 3:
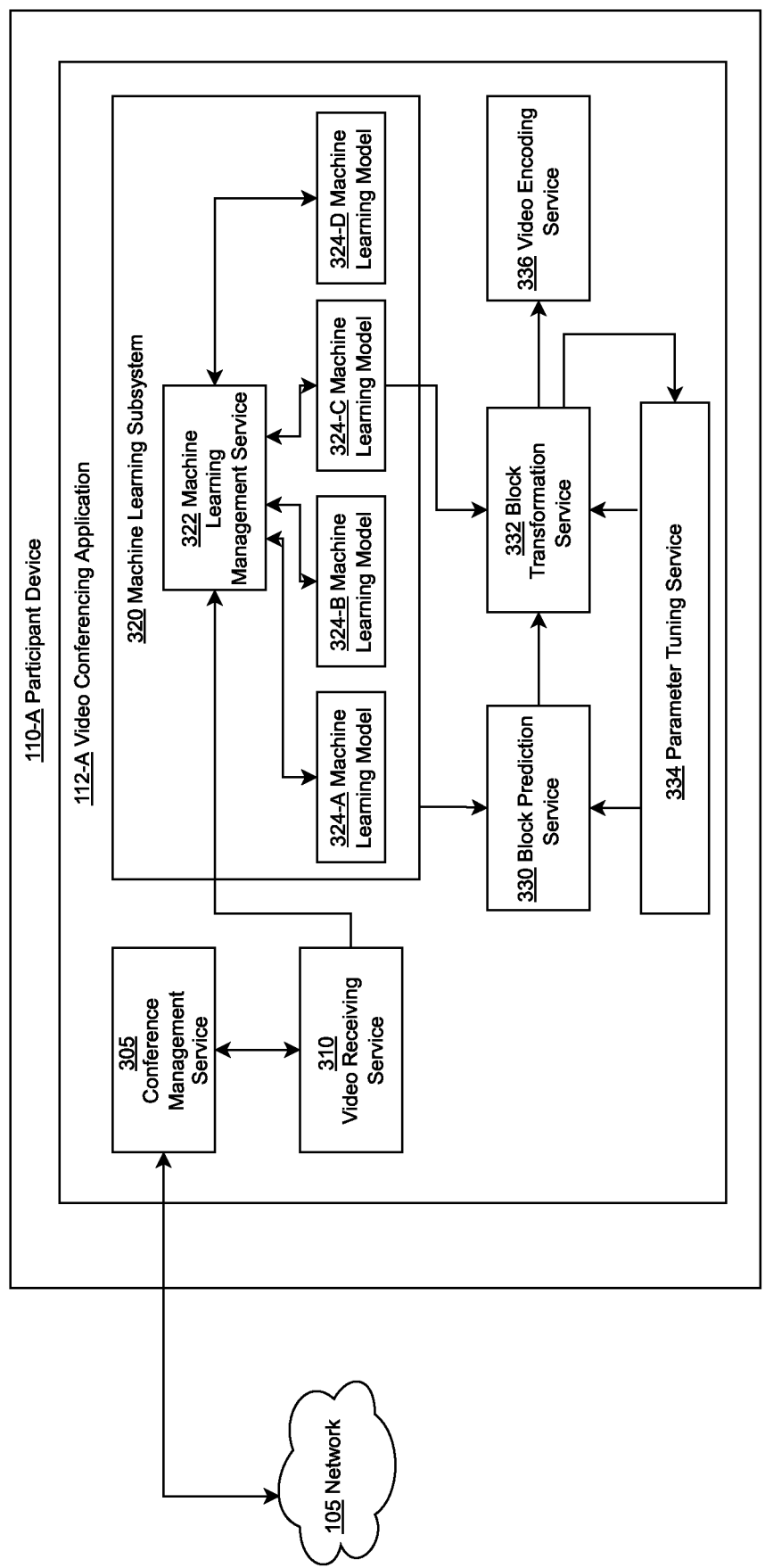
FIG. 3 is an expanded diagram of participant device, in an example embodiment.

FIG. 3 is an expanded diagram of participant device 110-A, according to an embodiment. In an embodiment, participant device 110-A contains sets of instructions, services, or modules which, when executed by one or more processors, perform various functions related to processing video for the video conferencing application 112-A. Services and components reflected in FIG. 3 are not limited to participant device 110-A, and other participant devices 110-B and 110-C may also include similar sets of instructions, services, or modules which, when executed by one or more processors, perform various functions related to processing video for video conferencing applications 112-B and 112-C, respectively. In FIG. 3, participant device 110-A is configured with video conferencing application 112-A, which is enabled to communicate with the meeting server 120 and other video conferencing applications 112-B and 112-C via network 105. Participant device 110-A, depicted in FIG. 3 represents just one illustrative example of a participant device and is not intended to be limited to having only the application and hardware components depicted in FIG. 3. Participant device 110-A may include other services and components, not currently displayed in FIG. 3, that assist with video processing and communication with the meeting server 120 and other participant devices 110-B and 110-C, such as a central processing unit (CPU), volatile and/or non-volatile memory, and a network interface controller.

Video data may represent any data associated with video captured by a video capture component, such as an integrated video camera or external video camera. Video data may include, but is not limited to, video frames, associated audio, and any metadata associated with the video captured, such as timestamps, location information, device capture information, and any other information.

In an embodiment, video conferencing application 112-A includes a conference management service 305, a video receiving service 310, a machine learning subsystem 320, a block prediction service 330, a block transformation service 332, a parameter tuning service 334, and a video encoding service 336. Other embodiments of the video conferencing application 112-A may include fewer or additional services and/or modules not currently depicted in FIG. 3.

3.1 Conference Management Service

In an embodiment, the conference management service 305 is configured to manage active and scheduled conferencing sessions, process function call requests, and manage connections between the meeting server 120 and other participant devices 110-B and 110-C. The conference management service 305 may send and receive data to and from the meeting server 120, including, but not limited to, sending video data captured by participant device 110-A, receiving video data from the meeting server 120 generated by other participants of the session, invoking meeting functions such as muting, sending and receiving chat messages, raising a hand, and any other function that communicates with the meeting server 120.

In an embodiment, the conference management service 305 is configured to send video encoding requests to the video receiving service 310. A video encoding request may represent a request to encode real-time video, or a video file related to a video conference session. For example, the conference management service 305 may manage a new video conference session and may send a request to the video receiving service 310 to process video captured by a video capture device, such as an integrated camera connected to participant device 110-A, during the video conference session. The conference management service 305 may receive encoded video from the video encoding service 336. The conference management service 305 may send the encoded video to the meeting server 120 and/or other participant devices 110-B and 110-C.

Video encoding requests sent by the conference management service 305 are not limited to processing real-time video. The conference management service 305 may send video encoding requests, to the video receiving service 310, to encode already captured video. For instance, if during the video conference session, participant device 110-A wishes to send previously captured video, such as video tutorial, to other participants, the conference management service 305 may send a request to encode the video tutorial to the video receiving service 310.

3.2 Video Receiving Service

In an embodiment, the video receiving service 310 is configured to receive a request to process video data from the conference management service 305. The request from the conference management service 305 may include either the video data to be processed in the form of a video file, a link to the video data, or a video stream of video frames to be processed. The video receiving service 310 is configured to extract video frames from the video data and send the video frames to the machine learning subsystem 320.

3.3 Machine Learning Subsystem

The machine learning subsystem 320 is configured to receive, as input, one or more video frames, determine an optimal encoding method, and generate optimal coding parameters for encoding the video frames.

Video frame encoding involves methods for compressing the size of video frames. Video frame encoding may include the phases of block prediction, transformation, and encoding. A video frame is an image represented by a set of pixels. A pixel represents the smallest element of an image. Each pixel has a corresponding pixel value which describes the brightness of the pixel and/or the color of the pixel. Encoding video frames may involve compressing the size of the video frame by storing pixel value differences between pixels instead of storing each pixel value. This process may be referred to as delta encoding, where the differences (deltas) between pixel values are stored instead of the pixel value itself. In situations where the differences between pixels in sequential video frames is small, delta encoding may reduce data redundancy, thereby requiring less space to store the video frame.

Video frame encoding algorithms compress video frames by partitioning a video frame into multiple segments, hereby referred to as blocks. Each block contains one or more pixels that may be similar to other blocks within the same video frame or blocks in a previous video frame. During the encoding process, video frame encoding algorithms may compress the size of video frames by taking two blocks and computing delta values for corresponding pixels of the two blocks and storing the delta values rather than storing the pixel value data. When blocks are similar, their corresponding delta values may be smaller, thereby requiring less storage space to store the delta values over pixel values for a given block. For example, if a video frame contains a large portion of a blue sky and two blocks being compared are blocks of the blue sky, then the corresponding pixel values of the two blocks of blue sky may be similar, resulting in delta values equaling zero or very close to zero. In contrast, if two blocks of a video frame being compared are of different objects with different colors, then the corresponding pixel values of the two blocks may be different, resulting in larger delta values.

The process of determining similar blocks from previous video frames or within the same video frame is called the prediction stage. Different encoding methods may implement different prediction methods for the prediction stage. Examples of different encoding methods that utilize different prediction methods include, but are not limited to, inter block prediction, intra block prediction, intra-block-copy prediction, and palette prediction.

Inter block prediction represents a prediction method in which pixel values within a block, at a particular position, from a current video frame are compared to corresponding pixel values within a corresponding block, at the same particular position, for a prior video frame. Inter block prediction optimizes situations in which objects from the prior video frame are in the same position in the current frame. For example, video frames that capture the Statute of Liberty in the background may have blocks representing portions of the Statute of Liberty. These blocks may not change between successive video frames and as a result the video frames containing the Statute of Liberty may be good candidates for using inter block prediction.

Intra block prediction represents a prediction method in which pixel values within a block, at a particular position, from the current video frame are compared to pixel values within another block, at a position neighboring the particular position, from the current video frame. That is, intra block position compares pixel values from neighboring blocks within a single video frame. Intra block prediction optimizes situations in which neighboring blocks have similar colors and brightness. For example, if a portion of a video frame contains blue sky, then the blocks containing the blue sky would be good candidates for intra block prediction as adjacent blocks of the blue sky would have minimal delta values.

Intra-block-copy prediction represents a prediction method in which pixel values within a block, at a particular position, are compared to pixel values of another block, within the same video frame. The difference between intra block prediction and intra-block-copy prediction is that intra block prediction compares pixel values of adjacent blocks, while intra-block-copy prediction compares pixel values of non-adjacent blocks. For instance, if a video frame contains a pattern, then the pattern may be a good candidate for intra-block-copy prediction.

Palette prediction represents a prediction method in which pixel values within blocks may be stored for later retrieval. For example, identified objects and/or colors may be stored within a data store as a palette of video frame features. During encoding, references to the palette may be stored within the encoded video frame instead of the actual pixel values. The data store may be accessed during decoding to display the video frame including its features that were stored within the palette.

In an embodiment, the machine learning subsystem 320 includes a machine learning management service 322 and machine learning models 324-A, 324-B, 324-C, and 324-D. In other embodiments, the machine learning subsystem 320 may include more or fewer services than what is depicted in FIG. 3.

3.3.1 Machine Learning Models

In an embodiment, machine learning models 324-A, 324-B, 324-C, and 324-D each represent a machine learning model configured to compute optimized encoding parameters based on one or more video frames provided by the machine learning management service 322. Each of the machine learning models 324-A, 324-B, 324-C, and 324-D in FIG. 3 may represent a different prediction method. For example, machine learning model 324-A may represent a machine learning model trained to output optimized encoding parameters based on inter block prediction. Machine learning model 324-B may represent a machine learning model trained to output optimized encoding parameters based on intra block prediction. Machine learning model 324-C may represent a machine learning model trained to output optimized encoding parameters based on intra-block-copy prediction. Machine learning model 324-D may represent a machine learning model trained to output optimized encoding parameters based on palette prediction. FIG. 3 depicts the machine learning subsystem 320 having four machine learning models 324-A-324-D however, other embodiments of the machine learning subsystem 320 may have more or less machine learning models. For instance, if the machine learning subsystem 320 is configured to analyze additional encoding methods, other than inter block prediction, intra block prediction, intra-block-copy prediction, and palette prediction, then machine learning subsystem 320 may contain additional machine learning models representing the additional encoding methods. In another embodiment, machine learning models may be trained to output optimized encoding parameters for multiple prediction methods. For example, machine learning model 324-A may be configured to output optimized encoding parameters for inter block prediction as well as intra block prediction.

The machine learning models 324-A-324-D may represent models implemented using Convolutional Neural Networks (CNN), Transformer Neural Network, or any other type of machine learning model. Further details describing implementations of different machine learning models is described in the MACHINE LEARNING MODELS OVERVIEW section herein. In an embodiment, the machine learning models 324-A-324-D may implement a CNN using hierarchical image information. That is, the machine learning models 324-A-324-D use hierarchical image information to identify relevant features within video frames. For example, if the current video frame being analyzed contains an image of a triangle, then the machine learning model 324-A (inter block prediction) may identify the object as a triangle and then use the object information of identified triangle to determine whether the same triangle also exists in previous video frames. If objects are identified in multiple frames, then the video frame may be a good candidate for inter block prediction over other prediction methods. Another benefit to implementing CNN using hierarchical image information is that object identification reduces the need to perform pixel scanning of the video frames. Thereby increasing prediction efficiency.

In an embodiment, the CNN implements a 2-D convolutional operation on each pixel location [l, j] of the video frame, with shared coefficients (kernel) K:

$$z_{ij} = \sum_{kl} K_{kl} x_{(i+k)(j+l)}$$

where x represents an input pixel from the video frame into the CNN, z represents the output from the CNN, K represents either a fixed or trained coefficient of the CNN.

In an embodiment, a neural network stage of the CNN is defined by a cascade of neural network layers, in which each element is a nonlinear function (g) followed by a multiple accumulation operation. Each element has its own coefficient W, as shown below:

$$y_j = g\left(\sum_i W_{ij} x_i\right)$$

where x represents input into the neural network layer, y represents the output, W represents the trained coefficient for the neural network.

In another embodiment, the machine learning models 324-A-324-D may implement a transformer neural network. The transformer neural network is implemented to compute objects within their window and compute locations for those objects. For example, the transformer neural network takes a current block and summarizes its contents into one or more mini-objects, a reference window summarizes its contents into one or more mini-objects, and then the mini-objects are compared to determine whether a match is found. The transformer neural network selects the most relevant input pixels to represent the objects within the window. This object matching method improves model performance detailed by the following equation:

$$z_{ij} = \sum_{kl} W_{kl} x_{(i+k)(j+l)}$$

where x represents an input pixel from the video frame into the transformer neural network, z represents the output from the transformer neural network, W represents either a fixed or trained coefficient of the transformer neural network.

Details for training the machine learning models 324-A-324-D are described in the TRAINING MACHINE LEARNING MODELS section herein.

Types of output parameters generated by the machine learning models 324-A-324-D may be specific to the type of encoding method selected. For example, output parameters may include, but are not limited to, block partition parameters, prediction mode parameters, transform partition parameters, loop filter parameters, motion vector parameters, transform partition parameters, intra copy mode parameters, and pallet coding mode parameters.

Block partitioning determines how an input video frame is partitioned into M×N blocks. For example, a video frame may be partitioned into 16×16 blocks, 4×4 blocks, or any other number of blocks. During block partitioning the video frame is coded as a coded tree unit (CTU). A CTU represents the basic processing unit for the High Efficiency Video Coding (HVEC) video standard. The CTU may have one or two trees, where each tree comprises coded subblocks of the input video frame. Block partition parameters affect the overall coding efficiency and may be referred to as split_modes. Block partition parameters may be generated by models for inter block prediction (machine learning model 324-A), intra block prediction (machine learning model 324-B), intra-block copy prediction (machine learning model 324-C), and palette prediction (machine learning model 324-D).

Prediction modes represent modes used to determine how neighboring pixels of a CTU are used to predict each subblock. Prediction modes may be specific to the type of prediction method. For example, the prediction modes for inter block prediction (machine learning model 324-A) are used to determine how neighboring pixels of reference pictures, such as a prior video frames, of the CTU are used to predict each subblock. In another example, the prediction modes for intra block prediction (machine learning model 324-B) are used to determine how neighboring pixels of a subblock of the CTU are used to predict each subblock. Prediction mode parameters may be generated by models for inter block prediction (machine learning model 324-A) and intra block prediction (machine learning model 324-B).

Transform partition parameters are used to affect how efficiently the transformation phase performs. The transformation phase occurs after the prediction phase and is used to increase the degree of compression for a video frame. For example, spectral transformation, such as Fourier cosine transform, may be used to increase compression. For transform partition parameters the predicted input is coded as a transform unit (TU) containing transform subblock of the predicted input block. Transform partition parameters affect how efficiently overall transformation occurs and may be referred to as transform_modes. Transform partition parameters may be generated by models for inter block prediction (machine learning model 324-A), intra block prediction (machine learning model 324-B), intra-block copy prediction (machine learning model 324-C), and palette prediction (machine learning model 324-D).

Loop filter parameters refer to filtering flags that may be configured to improve encoding. Loop filter parameters may be generated by models for inter block prediction (machine learning model 324-A), intra block prediction (machine learning model 324-B), intra-block copy prediction (machine learning model 324-C), and palette prediction (machine learning model 324-D).

Motion vector parameters represent parameters used for predicted positions of predicted blocks. Motion vector parameters may be generated by models for inter block prediction (machine learning model 324-A) and intra-block copy prediction (machine learning model 324-C).

Intra copy mode parameters represent modes used to determine how a window of the CTU is used to predict each subblock. Intra copy mode parameters may be generated by intra-block copy prediction (machine learning model 324-C).

Pallet coding mode parameters represent modes used to determine how palette data is used to code each subblock. Palette coding parameters may be generated by palette prediction (machine learning model 324-D).

In an embodiment, machine learning model 324-A is configured to generate parameter values for block partition parameters, prediction mode parameters, motion vector parameters, transform partition parameters, and loop filter parameters for inter block prediction.

In an embodiment, machine learning model 324-B is configured to generate parameter values for block partition parameters, prediction mode parameters, transform partition parameters, and loop filter parameters for intra block prediction.

In an embodiment, machine learning model 324-C is configured to generate parameter values for block partition parameters, intra copy mode parameters, motion vector parameters, transform partition parameters, and loop filter parameters for intra-block copy prediction.

In an embodiment, machine learning model 324-D is configured to generate parameter values for block partition parameters, palette coding modes, transform partition parameters, and loop filter parameters for palette prediction.

3.3.2 Machine Learning Management Service

In an embodiment, the machine learning management service 322 is implemented to determine an optimal encoding method for an input video frame received from the video receiving service 310. For example, the machine learning management service 322 receives a video frame and one or more video frames that preceded the current video frame. The machine learning management service 322 determines, based on the current video frame and the one or more preceding video frames, which prediction method is best suited for encoding the current video frame by providing each of the machine learning models 324-A, 324-B, 324-C, and 324-D with the current video frame and the one or more preceding video frames as input. The machine learning models 324-A, 324-B, 324-C, and 324-D generate encoding parameters based on the input current video frame and the one or more preceding video frames.

In an embodiment, the machine learning management service 322 is configured to receive encoding parameters from the trained machine learning models 324-A, 324-B, 324-C. and 324-D. The machine learning management service 322 uses the received encoding parameters to calculate sets of delta values for the current video frame, where each set of delta values represents one type of encoding method. For example, the machine learning management service 322 uses the encoding parameters from each of the machine learning models 324-A, 324-B, 324-C, and 324-D to generate delta values for the current video frame that represent each of the encoding methods inter block prediction, intra block prediction, intra-block copy prediction, and palette prediction. Once the sets of delta values are calculated, the machine learning management service 322 determines which prediction method is optimal for the current video frame based on which prediction method yields the smallest set of delta values. For example, if the current video frame analyzed is a landscape picture with green grass and a clear blue sky, then machine learning management service 322 may determine, from the sets of delta values, that intra block prediction yields the smallest set of delta values and is therefore the most efficient prediction method for encoding and compressing the received video frame.

Upon determining the optimal video encoding method, the machine learning management service 322 provides the output encoding parameters, from the machine learning model that resulted in the smallest set of delta values, to the block prediction service 330 and the block transformation service 332 for video frame encoding.

3.4 Block Prediction Service

In an embodiment, the block prediction service 330 is configured to analyze the current video frame and identify similar blocks of pixels either within the current video frame or from a previous video frame, in order to calculate residual values, where residual values represent pixel value differences between blocks. For example, using intra block prediction the residual values represent pixel value differences between adjacent blocks in the current video frame. Alternatively, residual values for inter block prediction represent pixel value differences between blocks from the current video frame and a previous video frame.

In an embodiment, the block prediction service 330 selects the prediction method for calculating residual values based on the selected encoding method and output encoding parameters received from the machine learning management service 322. For instance, if the machine learning management service 322 determines that inter block prediction is the optimal encoding method, then the block prediction service 330 will predict residual values for blocks of the current video frame, based on inter block prediction. The block prediction service 330 will calculate residual values using the output encoding parameters provided by machine learning management service 322 from one of the machine learning models 324-A-324-D. The output residual value for the current video frame are then provided to the block transformation service 332.

3.5 Block Transformation Service

In an embodiment, the block transformation service 332 is configured to further encode and compress the current video frame by performing spectral transformation using output encoding parameters provided by the machine learning management service 322. The machine learning management service 322 provides transformation parameters generated by one of the machine learning models 324-A-324-D. The block transformation service 332 may use various transformation methods, such as Fourier cosine transform to further increase the degree of compression of the current video frame. The block transformation service 332 may provide the transformed video frame to the parameter tuning service 334 for further parameter refinement.

3.6 Parameter Tuning Service

The machine learning subsystem 320 is configured to predict one or more optimal encoding parameters for the prediction and transformation stages of video frame encoding. However, predictions of encoding parameters may not always yield an optimal video frame compression. For example, the machine learning subsystem 320 may produce limited prediction accuracy for motion vector parameters resulting in less-than-optimal video frame compression. As a result, there is a need to evaluate whether output encoding parameter values need to be adjusted in order to yield better compression for the video frame.

In an embodiment, the parameter tuning service 334 is configured to fine tune encoding parameter values in order to further optimize video encoding. The parameter tuning service 334 is configured to generate sets of alternative encoding parameters for evaluation. The sets of alternative encoding parameters may be values based on a range of encoding parameter values provided by the machine learning management service 322. In an embodiment, the machine learning models 324-A-324-D may provide ranges of encoding parameter values to the machine learning management service 322, which may then provide the ranges to the parameter tuning service 334.

The parameter tuning service 334 may generate a set of alternative encoding parameter values based on the ranges of encoding parameter values and provide the set of alternative encoding parameter values to the block prediction service 330 and the block transformation service 332 to generate an alternative transformed video frame. Once the alternative transformed video frame is generated, the parameter tuning service 334 may calculate a set of delta values for the transformed video frame, which are based on the optimal encoding parameters received from the machine learning management service 322, and a set of delta values for the alternative transformed video frame. The set of delta values for the transformed video frame is based on pixel value comparisons between the original, unencoded, current video frame and the transformed video frame. The set of delta values for the alternative transformed video frame is based on pixel value comparisons between the original, unencoded, current video frame and the alternative transformed video frame. The parameter tuning service 334 may determine which transformed video frame yields optimal video compression by determining which set of delta values are smaller.

In an embodiment, the parameter tuning service 334 may iteratively evaluate each of the encoding parameter values in the ranges of encoding parameter values using delta value comparison. Once an optimal set of encoding parameter values is determined, the parameter tuning service 334 may send the transformed video frame generated using the optimal set of encoding parameter values to the video encoding service for further video encoding.

3.7 Video Encoding Service

In an embodiment, the video encoding service 336 is configured to perform entropy encoding on the transformed video frame generated by the block transformation service 332. The video encoding service 336 takes the transformed video frame and the optimal encoding parameters and encodes the data, using arithmetic coding algorithms, into a bitstream, whose bitstream lengths are used to regulate neural network coefficients. Arithmetic coding algorithms represent one form of entropy encoding that uses lossless data compression. In other embodiments, entropy encoding may be performed using other types of encoding methods such as Huffman encoding. The output of the video encoding service 336 represents an encoded video frame produced using the optimal encoding parameters.

4.0 Procedural Overview

Figure 4:
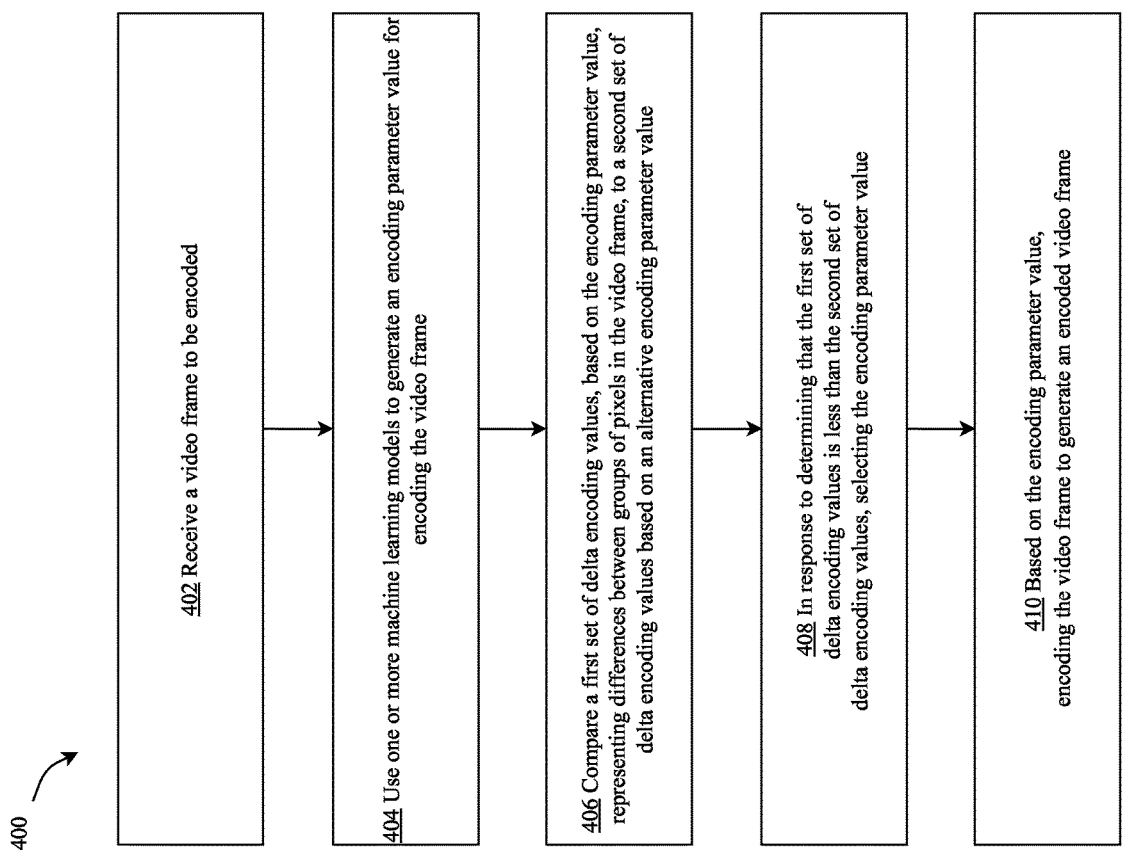
FIG. 4 is a flowchart for encoding of a video frame using a machine learning model to select optimized encoding parameters, in an example embodiment.

FIG. 4 depicts a flowchart for encoding of a video frame using a machine learning model to select optimized encoding parameters. Process 400 may be performed by a single program or multiple programs. The steps of the process as shown in FIG. 4 may be implemented using processor-executable instructions that are stored in computer memory. For the purposes of providing a clear example, the steps of FIG. 4 are described as being performed by computer programs executing on participant device 110-A. For the purposes of clarity, process 400 is described in terms of a single entity.

In an embodiment, FIG. 4 depicts a video conferencing application 112-A running on participant device 110-A where a video conferencing session is taking place with video capture enabled. The conference management service 305 may enable video encoding by sending a request to the video receiving service 310 to start receiving video frames.

At step 402, process 400 receives a video frame to be encoded. In an embodiment, the video receiving service 310 receives one or more video frames from a video capture device associated with the participant device 110-A. For example, participant device 110-A may include an integrated webcam that is enabled to capture video during the online meeting. The video capture service 310 may receive a particular video frame to be encoded as well as one or more preceding video frames.

At step 404, process 400 uses one or more machine learning models to generate an encoding parameter value for encoding the video frame. In an embodiment, the video receiving service 310 may send to the machine learning management service 322 the particular video frame to be encoded, as well as the one or more preceding video frames. The machine learning management service 322 may receive the particular video frame and the one or more preceding video frames and may send the particular video frame and the one or more preceding video frames to each of the machine learning models 324-A-324-D. In other examples, the machine learning management service 322 may send the particular video frame and the one or more preceding video frames to a single machine learning model or a subset of the machine learning models implemented within the machine learning subsystem 320.

In an embodiment, the machine learning models 324-A-324-D receive the particular video frame and the one or more preceding video frames as input and generate candidate encoding parameter values based on the prediction method type associated with each machine learning model 324-A-324-D. For example, the machine learning model 324-A may output one or more candidate encoding parameters based on inter block prediction. The machine learning model 324-B may output one or more candidate encoding parameters based on intra block prediction. The machine learning model 324-C may output one or more candidate encoding parameters based on intra-block-copy prediction. The machine learning model 324-D may output one or more candidate encoding parameters based on palette prediction.

In an embodiment, the machine learning management service 322 may receive the candidate encoding parameters and calculate sets of delta values for the particular video frame, where each set of delta values represents one type of encoding method. For instance, the machine learning management service 322 uses encoding parameters from each of the machine learning models 324-A, 324-B, 324-C, and 324-D to generate delta values for the particular video frame that represent each of the encoding methods of inter block prediction, intra block prediction, intra-block copy prediction, and palette prediction. Once the sets of delta values are calculated, the machine learning management service 322 determines which prediction method is optimal for the particular video frame based on which prediction method yields the smallest set of delta values.

In an embodiment, after the machine learning management service 322 determines which prediction method is optimal and which candidate encoding parameter should be selected as the encoding parameter, the machine learning management service 322 sends the encoding parameter to the block prediction service 330 and the block transformation service 332 for processing the particular video frame using the selected encoding parameter. The block prediction service 330 and the block transformation service 332 generate, using the selected encoding parameter, a transformed video frame.

At step 406, process 400 compares a first set of delta encoding values, based on the encoding parameter value, representing differences between groups of pixels in the particular video frame, to a second set of delta encoding values based on an alternative encoding parameter value. In an embodiment, the parameter tuning service 334 compares the encoding parameter value, used to generate transformed video frame, to an alternative encoding parameter value to determine whether fine tuning of parameter values is needed.

Figure 5:
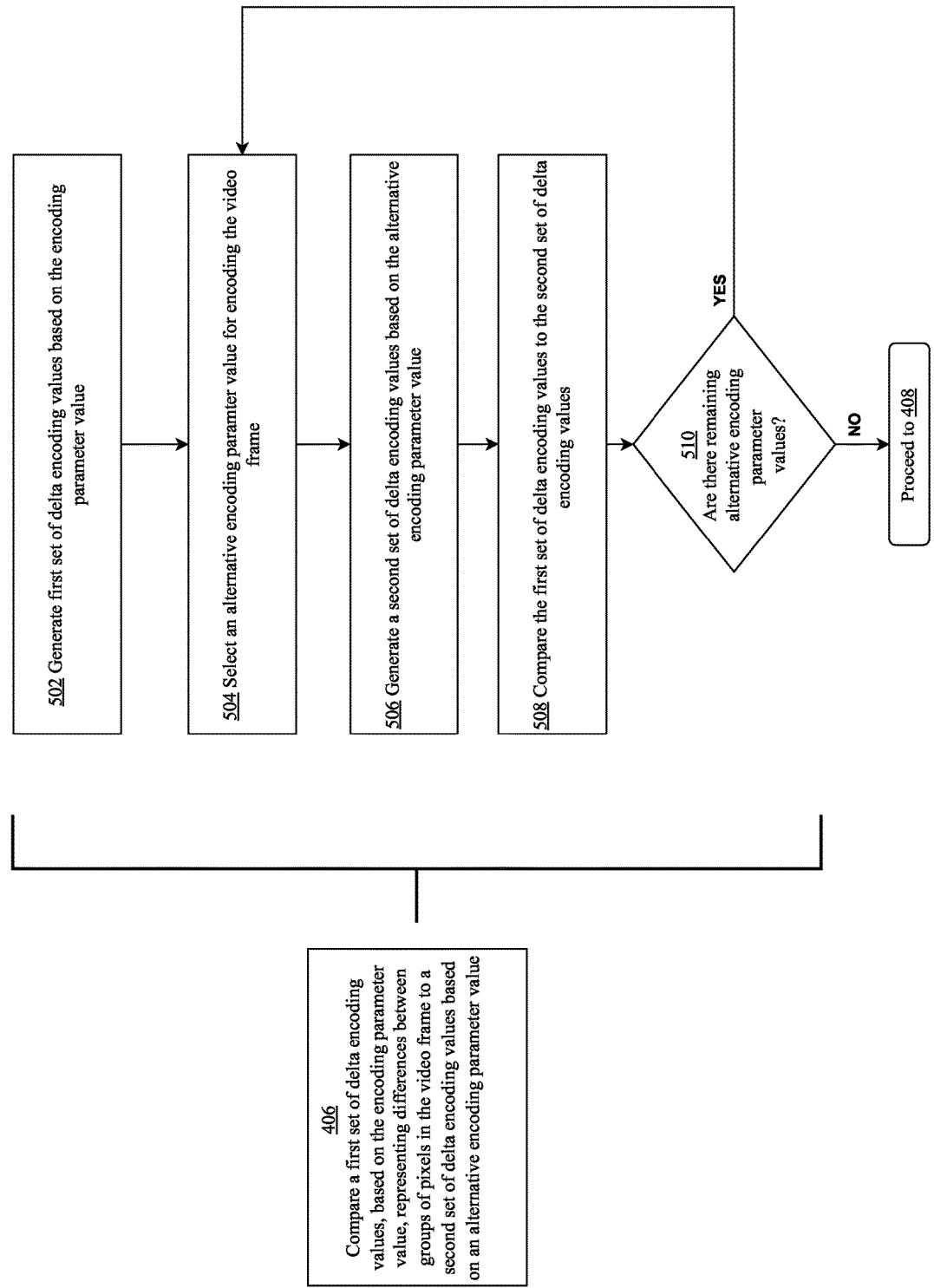
FIG. 5 is a flowchart for comparing delta encoding values generated based on the encoding parameter value to other delta encoding values generated based on an alternative encoding parameter value, in an example embodiment.

FIG. 5 depicts a flowchart for comparing delta encoding values generated based on the encoding parameter value to other delta encoding values generated based on an alternative encoding parameter value. Process 500 may be performed by a single program or multiple programs. The steps of the process as shown in FIG. 5 may be implemented using processor-executable instructions that are stored in computer memory. For the purposes of providing a clear example, the steps of FIG. 5 are described as being performed by computer programs executing on participant device 110-A. For the purposes of clarity process 500 is described in terms of a single entity. In an embodiment, the steps of the process shown in FIG. 5 represent more detailed steps for step 406 in FIG. 4.

In an embodiment, in order to compare alternative encoding parameter values to the encoding parameter value selected in step 404, the parameter tuning service 334 receives ranges of encoding parameter values from the machine learning management service 322. The ranges of encoding parameter values represent ranges of encoding parameter values used by machine learning models 324-A-324-D.

At step 502, process 500 generates a first set of delta encoding values based on the encoding parameter value. In an embodiment, the parameter tuning service 334 calculates a first set of delta values for the transformed video frame, which was based on the encoding parameter value sent from the machine learning management service 322 to the block prediction service 330 and block transformation service 332. The first set of delta values for the transformed video frame is based on pixel value comparisons between the original, unencoded, particular video frame and the transformed video frame.

At step 504, process 500 generates an alternative encoding parameter value for encoding the particular video frame. In an embodiment, the parameter tuning service 334 selects an alternative encoding parameter value from the ranges of encoding parameter values received from the machine learning management service 322. For example, if the range of encoding parameter values includes values from 1-10, and the encoding parameter value initially provided by the machine learning management service 322 is 1, then the parameter tuning service 334 may select the alternative encoding parameter value from the range 2-10, such as 2.

Upon selecting the alternative encoding parameter value, the parameter tuning service 334 provides the alternative parameter value to the block prediction service 330 and the block transformation service 332 for processing the particular video frame using the alternative encoding parameter. The block prediction service 330 and the block transformation service 332 generate, using the alternative encoding parameter, an alternative transformed video frame.

At step 506, process 500 generates a second set of delta encoding values based on the alternative encoding parameter value. In an embodiment, the parameter tuning service 334 calculates a second set of delta values for the alternative transformed video frame using the alternative encoding parameter value. The second set of delta values for the alternative transformed video frame is based on pixel value comparisons between the original, unencoded, particular video frame and the alternative transformed video frame.

At step 508, process 500 compares the first set of delta encoding values, based on the encoding parameter value, to the second set of delta encoding values based on the alternative encoding parameter value. In an embodiment, the parameter tuning service 334 determines which set of delta encoding values is smallest. For example, if the first set of delta encoding values is smaller than the second set of delta encoding values, then the encoding parameter value used to generate the first set of delta encoding values is a better encoding parameter value for encoding the particular video frame.

At decision diamond 510, process 500 determines whether there are remaining alternative encoding parameter values to be evaluated. In an embodiment, the parameter tuning service 334 determines whether there are any remaining encoding parameter values, in the range of encoding parameter values, to be evaluated. If there are no more encoding parameter values to be evaluated, then process 500 proceeds to step 408. If, however, there are additional encoding parameter values to be evaluated, then process 500 proceeds to step 504 to select another alternative encoding parameter value from the range of encoding parameter values.

Referring back to FIG. 4, at step 408, in response to determining that the first set of delta encoding values is less than the second set of delta encoding values, process 400 selects the encoding parameter value. In an embodiment, the parameter tuning service 334 selects the encoding parameter value and sends the encoding parameter value and the transformed video frame, generated by the block transformation service 332, to the video encoding service 336 for further encoding.

At step 410, process 400 encodes the video frame to generate an encoded video frame. In an embodiment, the video encoding service 336 takes the transformed video frame and the encoding parameter value and uses entropy encoding to encode the particular video frame to generate an encoded video frame.

In an embodiment, the encoded video frame may be compiled with other encoded video frames for the video to be encoded to generate an encoded video that has been encoded for optimal compression and video quality. The encoded video may be stored on participant device 110-A and/or transmitted to the meeting server 120 and the other participant devices 110-B, 110-C.

5.0 Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depend on the machine learning algorithm.

In supervised training, training data is used by a supervised training algorithm to train a machine learning model.

The training data includes input and a "known" output. In an embodiment, the supervised training algorithm is an iterative procedure. In each iteration, the machine learning algorithm applies the model artifact and the input to generate a predicted output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Inferencing entails a computer applying the machine learning model to an input such as a feature vector to generate an inference by processing the input and content of the machine learning model in an integrated way. Inferencing is data driven according to data, such as learned coefficients, that the machine learning model contains. Herein, this is referred to as inferencing by the machine learning model that, in practice, is execution by a computer of a machine learning algorithm that processes the machine learning model.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C #, Ruby, Lua, Java, MatLab, R, and Python.

5.1 Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

5.2 Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N [L−1] and N [L], respectively, the dimensions of matrix W is N [L−1] columns and N [L] rows.

Biases for a particular layer L may also be stored in matrix B having one column with N [L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need to be computed, and/or less derivative values need to be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

5.3 Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occur as explained above.

5.4 Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2 (1): 1-18 by Jinwon An et al.

5.5 Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

5.6 Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

6.0 Training Machine Learning Models

In an embodiment, the meeting server 120 may be implemented with services that generate and train machine learning models. Once trained the machine learning models are provided to the video conferencing applications 112-A-112-C. The meeting server 120 may implement a machine learning model training service that trains machine learning models using a reference encoder, such as a H266 reference encoder.

In an embodiment, the training process may be configured to implement a mean square error z with respect to the reference encoder to regulate neural network coefficients. Alternatively, the training process may be configured to use the mean square error of the prediction data. The following equation describes determining coefficient W for CNN or transformer neural network using backward coefficient propagation:

$$\frac{\partial z}{\partial W_{i-1,j}} = \sum_{i-1,k} \frac{\partial z}{\partial W_{ik}} \frac{\partial W_{ik}}{\partial W_{i-1,j}}$$

where z represents the mean square error between neural network output from a reference encoder, W represents the coefficient of the neural network.

The following equation describes determining coefficient K for CNN or transformer neural network using backward coefficient propagation:

$$\frac{\partial z}{\partial K_{i-1,j}} = \sum_{i-1,k} \frac{\partial z}{\partial K_{ik}} \frac{\partial K_{ik}}{\partial K_{i-1,j}}$$

where z represents the mean square error between neural network output from a reference encoder, K represents the coefficient of the neural network.

The following equations detail how coefficients for neural networks are subsequently updated:

$$W(t) = W(t-1) - \alpha \frac{\partial z}{\partial W}$$

$$K(t) = \text{average}\left[K(t-1) - \alpha \frac{\partial z}{\partial K}\right]$$

where z represents the mean square error between the neural network output and expected output from the reference encoder and α represents a training adjust constant.

In another embodiment, the training process may be configured to use bit-string lengths with respect to mean values. This training process does not use a reference encoder. Instead, training uses a difference of bit-string lengths to approximate mean square error, z, in order to regulate coefficients K and W. The following equations describe using the difference of bit-string lengths to approximate mean square error z for a CNN or transformer neural network:

W Coefficient:

$$\frac{\partial [s - \text{mean}(s)]}{\partial W_{i-1,j}} = \sum_{i-1,k} \frac{\partial [s - \text{mean}(s)]}{\partial W_{ik}} \frac{\partial W_{ik}}{\partial W_{i-1,j}}$$

K Coefficient:

$$\frac{\partial [s - \text{mean}(s)]}{\partial K_{i-1,j}} = \sum_{i-1,k} \frac{\partial [s - \text{mean}(s)]}{\partial K_{ik}} \frac{\partial K_{ik}}{\partial K_{i-1,j}}$$

where "s-mean(s)" represents the difference between encoded bitstream length and average bitstream length.

The following equations detail how coefficients for neural networks are subsequently updated for a CNN or transformer neural network:

W Coefficient:

$$W(t) = W(t-1) - \beta \frac{\partial [s - \text{mean}(s)]}{\partial W}$$

K Coefficient:

$$K(t) = K(t-1) - \beta \frac{\partial [s - \text{mean}(s)]}{\partial K}$$

where β represents a training adjust constant.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method for optimizing encoding of video frames from a video, the method comprising:
   receiving a video frame to be encoded;
   using one or more machine learning models:
   generating an encoding parameter value for encoding the video frame;
   comparing a first set of delta encoding values, based on the encoding parameter value, representing differences between groups of pixels of the video frame to a second set of delta encoding values, based on an alternative encoding parameter value, representing differences between the groups of pixels of the video frame;
   in response to determining that the first set of delta encoding values is less than the second set of delta encoding values, selecting the encoding parameter value;
   wherein the one or more machine learning models are trained using a reference encoder; and
   based on the encoding parameter value, encoding the video frame to generate an encoded video frame.

2. The computer-implemented method of claim 1, wherein comparing the first set of delta encoding values to the second set of delta encoding values, comprises:
   generating the first set of delta encoding values based on the encoding parameter value; selecting the alternative encoding parameter value for encoding the video frame; generating the second set of delta encoding values based on the alternative encoding parameter value; and
   comparing the first set of delta encoding values to the second set of delta encoding values.

3. The computer-implemented method of claim 1, wherein generating the encoding parameter value for encoding the video frame, comprises:
   using the one or more machine learning models to generate a set of candidate encoding parameter values;
   wherein each candidate encoding parameter value of the set of candidate encoding parameter values represents one type of encoding method, wherein types of encoding methods comprise intra-block encoding, inter-block encoding, intra-block-copy encoding, and palette encoding;
   for each candidate encoding parameter value from the set of candidate encoding value, generating sets of delta encoding values;
   determining, from the sets of delta encoding values, a particular set of delta encoding values with lowest delta encoding values; and
   selecting the encoding parameter value that corresponds to the particular set of delta encoding values.

4. The computer-implemented method of claim 1, wherein the one or more machine learning models are convolutional neural network models.

5. The computer-implemented method of claim 1, wherein the one or more machine learning models are transformer neural network models.

6. The computer-implemented method of claim 1, wherein the encoding parameter value is a parameter value for at least one of a block prediction and block transformation.

7. The computer-implemented method of claim 1, wherein the one or more machine learning models are further trained training using bit-string lengths.

8. A non-transitory, computer-readable medium storing a set of instructions for optimizing encoding of video frames, that, when executed by a processor, cause:
   receiving a video frame to be encoded;
   using one or more machine learning models:
   generating an encoding parameter value for encoding the video frame;
   comparing a first set of delta encoding values, based on the encoding parameter value, representing differences between groups of pixels of the video frame to a second set of delta encoding values, based on an alternative encoding parameter value, representing differences between the groups of pixels of the video frame;
   in response to determining that the first set of delta encoding values is less than the second set of delta encoding values, selecting the encoding parameter value;
   wherein the one or more machine learning models are trained using a reference encoder; and
   based on the encoding parameter value, encoding the video frame to generate an encoded video frame.

9. The non-transitory, computer-readable medium of claim 8, wherein comparing the first set of delta encoding values to the second set of delta encoding values, comprises:
   generating the first set of delta encoding values based on the encoding parameter value; selecting the alternative encoding parameter value for encoding the video frame; generating the second set of delta encoding values based on the alternative encoding parameter value; and
   comparing the first set of delta encoding values to the second set of delta encoding values.

10. The non-transitory, computer-readable medium of claim 8, wherein generating the encoding parameter value for encoding the video frame, comprises:
    using the one or more machine learning models to generate a set of candidate encoding parameter values;
    wherein each candidate encoding parameter value of the set of candidate encoding parameter values represents one type of encoding method, wherein types of encoding methods comprise intra-block encoding, inter-block encoding, intra-block-copy encoding, and palette encoding;
    for each candidate encoding parameter value from the set of candidate encoding value, generating sets of delta encoding values;
    determining, from the sets of delta encoding values, a particular set of delta encoding values with lowest delta encoding values; and
    selecting the encoding parameter value that corresponds to the particular set of delta encoding values.

11. The non-transitory, computer-readable medium of claim 8, wherein the one or more machine learning models are convolutional neural network models.

12. The non-transitory, computer-readable medium of claim 8, wherein the one or more machine learning models are transformer neural network models.

13. The non-transitory, computer-readable medium of claim 8, wherein the encoding parameter value is a parameter value for at least one of a block prediction and block transformation.

14. The non-transitory, computer-readable medium of claim 8, wherein the one or more machine learning models are further trained using bit-string lengths.

15. A network-based system for optimizing encoding of video frames, the system comprising:
- a processor;
- a memory operatively connected to the processor and storing instructions that, when executed by the processor, cause:
  - receiving a video frame to be encoded;
  - using one or more machine learning models:
    - generating an encoding parameter value for encoding the video frame; comparing a first set of delta encoding values, based on the encoding parameter value, representing differences between groups of pixels of the video frame to a second set of delta encoding values, based on an alternative encoding parameter value, representing differences between the groups of pixels of the video frame;
    - in response to determining that the first set of delta encoding values is less than the second set of delta encoding values, selecting the encoding parameter value;
  - wherein the one or more machine learning models are trained using a reference encoder; and
  - based on the encoding parameter value, encoding the video frame to generate an encoded video frame.

16. The system of claim 15, wherein comparing the first set of delta encoding values to the second set of delta encoding values, comprises:
- generating the first set of delta encoding values based on the encoding parameter value; selecting the alternative encoding parameter value for encoding the video frame; generating the second set of delta encoding values based on the alternative encoding parameter value; and
- comparing the first set of delta encoding values to the second set of delta encoding values.

17. The system of claim 15, wherein generating the encoding parameter value for encoding the video frame, comprises:
- using the one or more machine learning models to generate a set of candidate encoding parameter values;
- wherein each candidate encoding parameter value of the set of candidate encoding parameter values represents one type of encoding method, wherein types of encoding methods comprise intra-block encoding, inter-block encoding, intra-block-copy encoding, and palette encoding;
- for each candidate encoding parameter value from the set of candidate encoding value, generating sets of delta encoding values;
- determining, from the sets of delta encoding values, a particular set of delta encoding values with lowest delta encoding values; and
- selecting the encoding parameter value that corresponds to the particular set of delta encoding values.

* * * * *